(12) United States Patent
Delgorgue et al.

(10) Patent No.: US 8,794,105 B2
(45) Date of Patent: Aug. 5, 2014

(54) DEVICE FOR CONNECTING A SHOE TO A SPORTS ARTICLE, SUCH AS A CYCLE PEDAL

(75) Inventors: Gérald Delgorgue, Ruffieux (FR); Gilles Parquet, Menthonnex en Bornes (FR)

(73) Assignee: Mavic SAS, Metz-Tessy (FR)

( * ) Notice: Subject to any disclaimer, the term of this patent is extended or adjusted under 35 U.S.C. 154(b) by 808 days.

(21) Appl. No.: 12/440,396

(22) PCT Filed: Aug. 8, 2007

(86) PCT No.: PCT/FR2007/001356
§ 371 (c)(1),
(2), (4) Date: Jul. 23, 2009

(87) PCT Pub. No.: WO2008/029008
PCT Pub. Date: Mar. 13, 2008

(65) Prior Publication Data
US 2009/0320641 A1    Dec. 31, 2009

(30) Foreign Application Priority Data

Sep. 8, 2006 (FR) ..................................... 06 07875

(51) Int. Cl.
*B62M 3/00* (2006.01)
*A43B 5/14* (2006.01)
(52) U.S. Cl.
CPC . *A43B 5/14* (2013.01); *B62M 5/086* (2013.01)
USPC ........................................................ 74/594.6

(58) Field of Classification Search
USPC ................. 74/594.4, 594.6; 36/131; 280/11.3
See application file for complete search history.

(56) References Cited

U.S. PATENT DOCUMENTS

| 589,443 | A | * | 9/1897 | Rathbun | 36/59 R |
|---|---|---|---|---|---|
| 3,952,428 | A | * | 4/1976 | Polsky | 36/131 |
| 4,298,210 | A | * | 11/1981 | Lotteau et al. | 280/259 |
| 4,538,480 | A | * | 9/1985 | Trindle | 74/594.5 |
| 4,662,090 | A | * | 5/1987 | Solano | 36/131 |
| 4,953,425 | A | | 9/1990 | Barefoot | |
| 5,211,076 | A | * | 5/1993 | Baume et al. | 74/594.6 |
| 6,725,742 | B2 | | 4/2004 | Bremer | |

FOREIGN PATENT DOCUMENTS

EP         0 464 628  A1    1/1992

* cited by examiner

*Primary Examiner* — Vicky Johnson
(74) *Attorney, Agent, or Firm* — Greenblum & Bernstein, P.L.C.

(57) ABSTRACT

A device for connecting a shoe to a part of a sports article such as a bicycle pedal, of the type in which the shoe and the pedal comprise attachment members of complementary shapes, wherein the attachment members of the sole are comprised at least partly of alternations of depressions recessed into the outer envelope surface of the sole. The outer envelope surface of the sole is raised upwards ahead of the region of the attachment members of the sole.

27 Claims, 5 Drawing Sheets

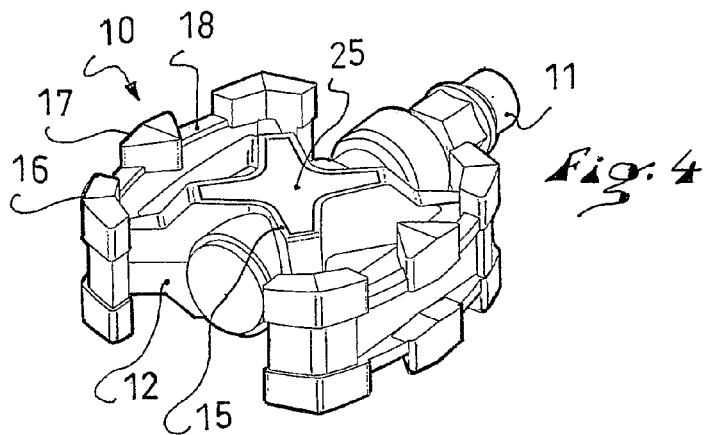
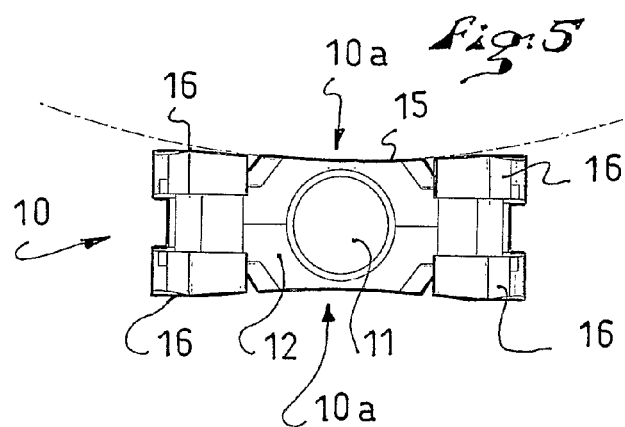
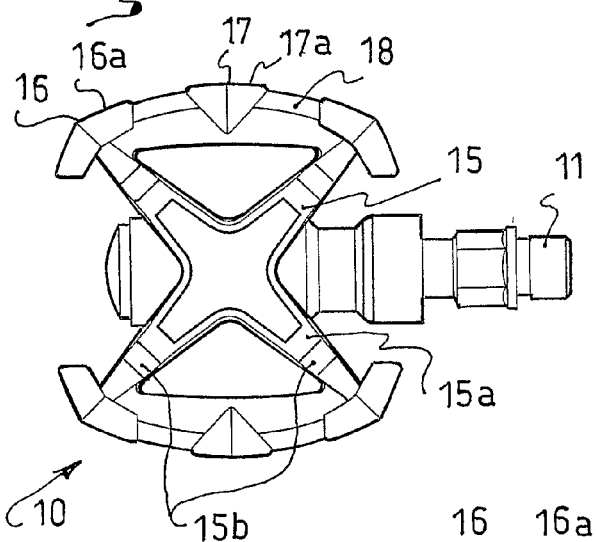
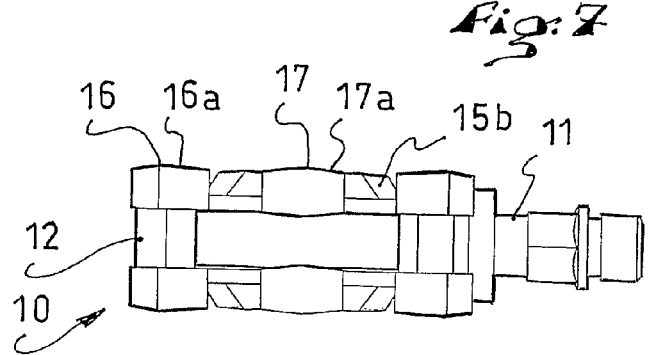

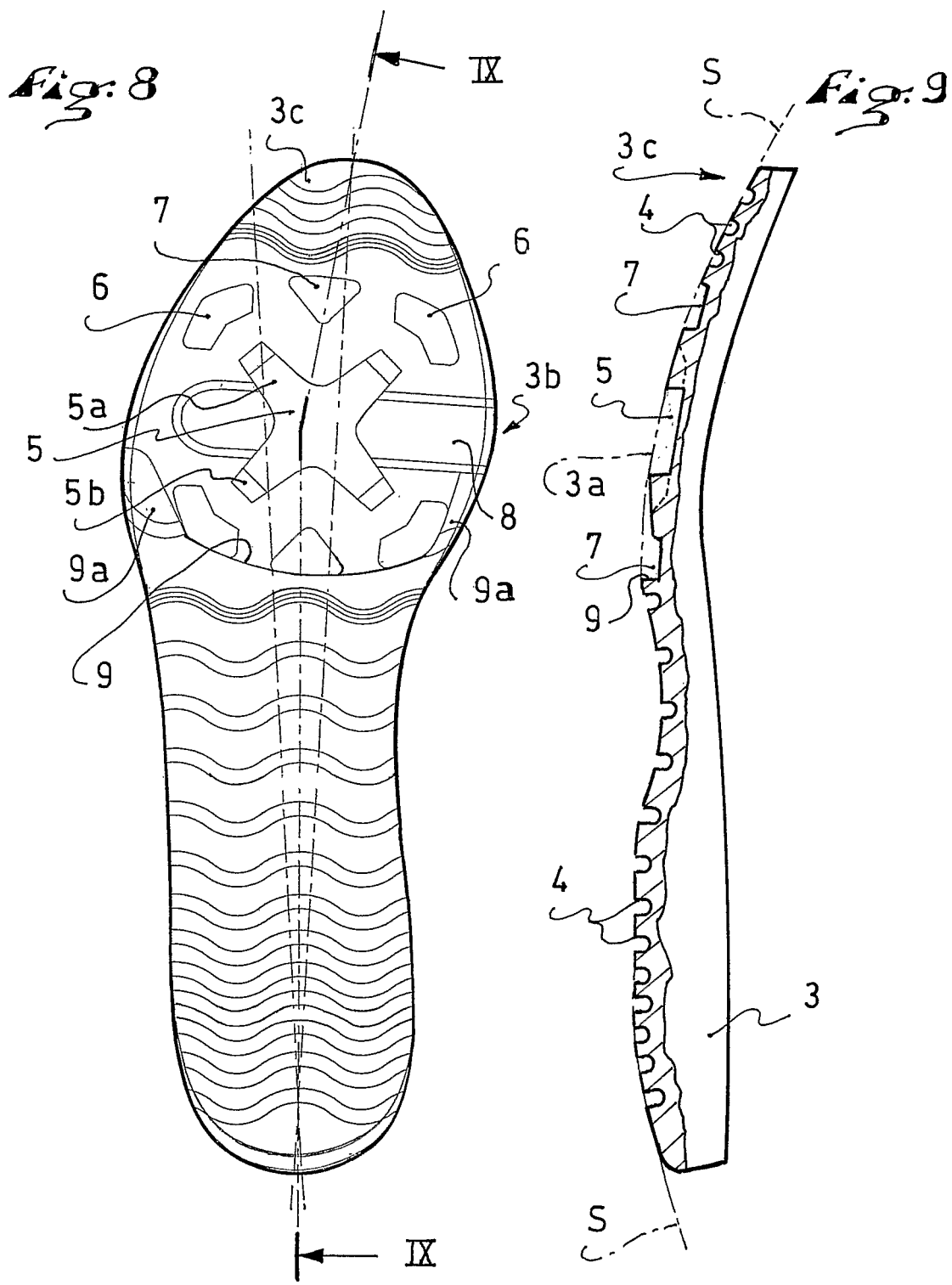

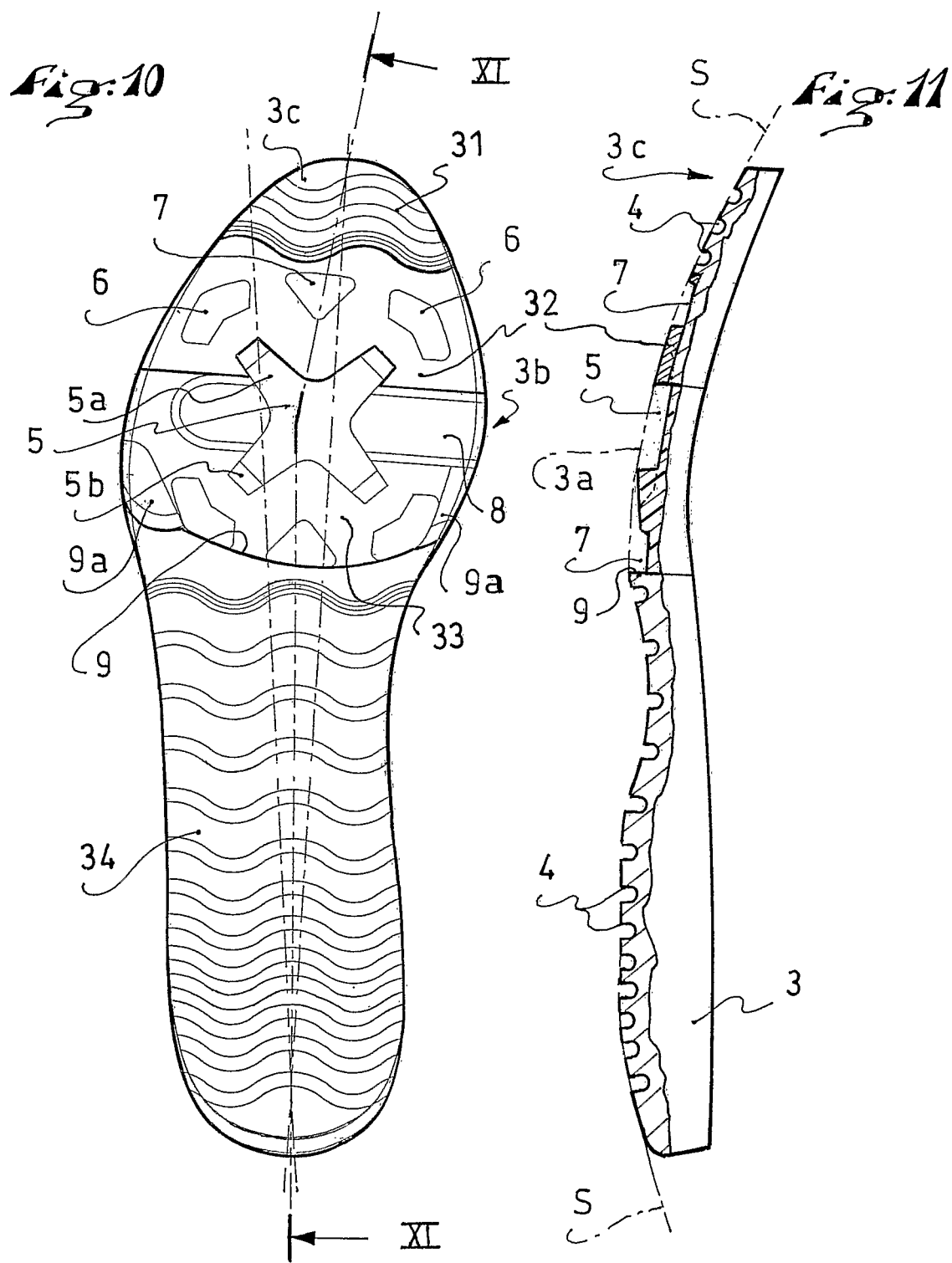

DEVICE FOR CONNECTING A SHOE TO A SPORTS ARTICLE, SUCH AS A CYCLE PEDAL

BACKGROUND OF THE INVENTION

1. Field of the Invention

The present invention relates to a device for connecting a shoe to an element of a sports article such as a pedal of a cycle, bicycle, or similar apparatus. The invention also relates to the portions of the device that are affixed to the pedal as well as to the shoe.

2. Background Information

Various systems are known for connecting a shoe to a pedal.

The oldest system is comprised of a sort of cage associated with a strap, or a stirrup-like device, commonly referred to as a toe-clip, which confines the front half of the shoe, once the strap is tightened, and affixes the shoe completely to the pedal.

Such a device has the disadvantage of causing a positive engagement of the shoe to the pedal and not allowing a quick release of the shoe, if necessary, especially during risks of an accident or of a fall, or during a stop, when the cyclist needs to set a foot on the ground.

Moreover, these toe-clip devices are not very easy to install, because insertion of the shoe in the stirrup-like device constituting the toe-clip is difficult, and the requirement of tightening the strap thereafter in order to hold the foot satisfactorily.

U.S. Pat. No. 4,953,425 discloses a device for connecting a shoe to a pedal, which is constituted of a strap extending diagonally with respect to the pedal. Due to its diagonal position, the strap forms a larger opening that facilitates the insertion as well as the extraction of the foot. The strap can be more or less tightened depending upon the desired degree of holding. The problem with such a connecting device is that the strap tends to be flattened, which prevents the insertion of the foot. In addition, when the strap is tightened, the same problem of release encountered with the conventional toe-clips arises.

There also exist so-called clipless systems, in which a metal or plastic cleat affixed to the sole cooperates with an associated mechanism of the pedal, the coupling being formed along a longitudinal direction, and the uncoupling, in the event of a fall or of a stop, being obtained by an outward rotation of the foot.

This type of clipless pedal nevertheless requires the user to practice for a period of time, as the outward foot rotational movement, if necessary, is not a natural movement.

During this phase of practice on a clipless pedal system, or in the event of an emergency, the cyclist sometimes has difficulty performing this maneuver and thus falls down with the bicycle, with both feet remaining attached to the pedals.

Furthermore, the cleats attached to the shoe form projections with respect to the outer surface of the walking sole, which constitutes a considerable hindrance to walking, and even risks an accident by slipping.

Furthermore, such clipless pedal systems are very sensitive to the presence of mud and stones which can prevent the shoe from attaching properly to the pedal, or otherwise promote an ill-timed detachment.

U.S. Pat. No. 4,662,090 discloses a pedal/sole connecting system by creating, in the sole, a substantially rectangular recess that is complementary to the shape of the pedal.

Such a construction has the disadvantage that the recess of the sole is very large and can constitute a housing for mud and stones during walking.

Furthermore, this recess is completely hidden, as it is set back with respect to the outer envelope of the walking surface and demarcated by two sorts of steps, in particular at the front, which hinder the positioning of the sole on the pedal. In other words, the user must proceed by trial and error before finding the exact correspondence between the pedal and the recess of the sole.

U.S. Pat. No. 6,725,742 discloses a connection of the pedal, which has recesses, with studs of the shoe which project with respect to the bottom surface of the walking sole. The same problem mentioned above with respect to the blind positioning of the sole in the pedal arises.

Furthermore, the connection is made using elements of the sole, namely the studs, which are subjected to wear during walking, and can make the connection unstable due to premature wear. The release, if necessary, is not easy either.

Currently, the most widely used connecting devices are the toe-clip or clipless cleat/pedal systems mentioned hereinabove.

Due to the risks related to the difficulty of release, as mentioned above, only some cyclists use these systems, the others fearing the risk of falling.

As a result, a number of cyclists do not use any connecting or toe-clipping system of their shoe on the pedal and, therefore, have a poor pedaling position.

Ideally, the foot must be positioned so that the axis of the metatarsophalangeal joint is approximately aligned with the axis of rotation of the pedal.

This ideal position can be obtained using the connecting/toe-clipping/fastening devices described above. In the absence of such devices, the user often positions his/her foot incorrectly, for example too far to the rear on the pedal, or the foot is arranged in a fan-shape fashion with respect to the axis of the pedal.

However, an incorrect position of the foot with respect to the pedal generally leads to an incorrect position of the cyclist (saddle too low) and results in greater fatigue and/or increased traumas, especially in the area of the knees.

SUMMARY OF THE INVENTION

The present invention provides a device for connecting a shoe to an element of a sports article such as a pedal, which makes it possible to overcome the aforementioned disadvantages.

The invention particularly facilitates the shoe/pedal connection, even in a blind fashion.

In addition, the invention ensures a correct positioning of the foot with respect to the pedal.

Further, the invention provides, if necessary, a connecting device that does not pose any risk of blocking the sole.

Other features and advantages of the present invention will become apparent from the description that follows.

In a particular embodiment, the invention includes a device for connecting a shoe to an element of a sports article such as a cycle pedal according to the invention, which is of the type in which the shoe and the pedal comprise attachment members having complementary shapes, the attachment members of the sole being at least partially constituted by alternating recesses, set back with respect to the outer envelope surface of the sole.

Due to this construction, the attachment members of the sole do not project beyond the outer envelope surface of said sole, and are therefore not subjected to risks of ill-timed wear and tear. They do not negatively affect walking either.

According to one embodiment, the outer envelope surface of the sole is raised upward forward of the zone of the attachment members of the sole.

This construction defines a ramp at the front of the attachment members and thus facilitates the engagement, even in a blind fashion, of the shoe on the pedal.

BRIEF DESCRIPTION OF THE INVENTION

In any event, the invention will be readily understood and other characteristics and advantages thereof will become apparent from the description that follows, with reference to the annexed schematic drawings, and in which:

FIG. 4 is a perspective view of the pedal;

FIG. 5 is an end view of the pedal of FIG. 4;

FIG. 6 is a top view of the pedal of FIG. 4;

FIG. 7 is a side view of the pedal of FIG. 4;

FIG. 8 is a bottom view of the sole of the shoe;

FIG. 9 is a cross-sectional view along the line IX-IX of FIG. 8;

FIG. 10 is a view similar to FIG. 8 according to another embodiment;

FIG. 11 is a cross-sectional view along the line XI-XI of FIG. 10.

DETAILED DESCRIPTION OF THE INVENTION

Figure 1:
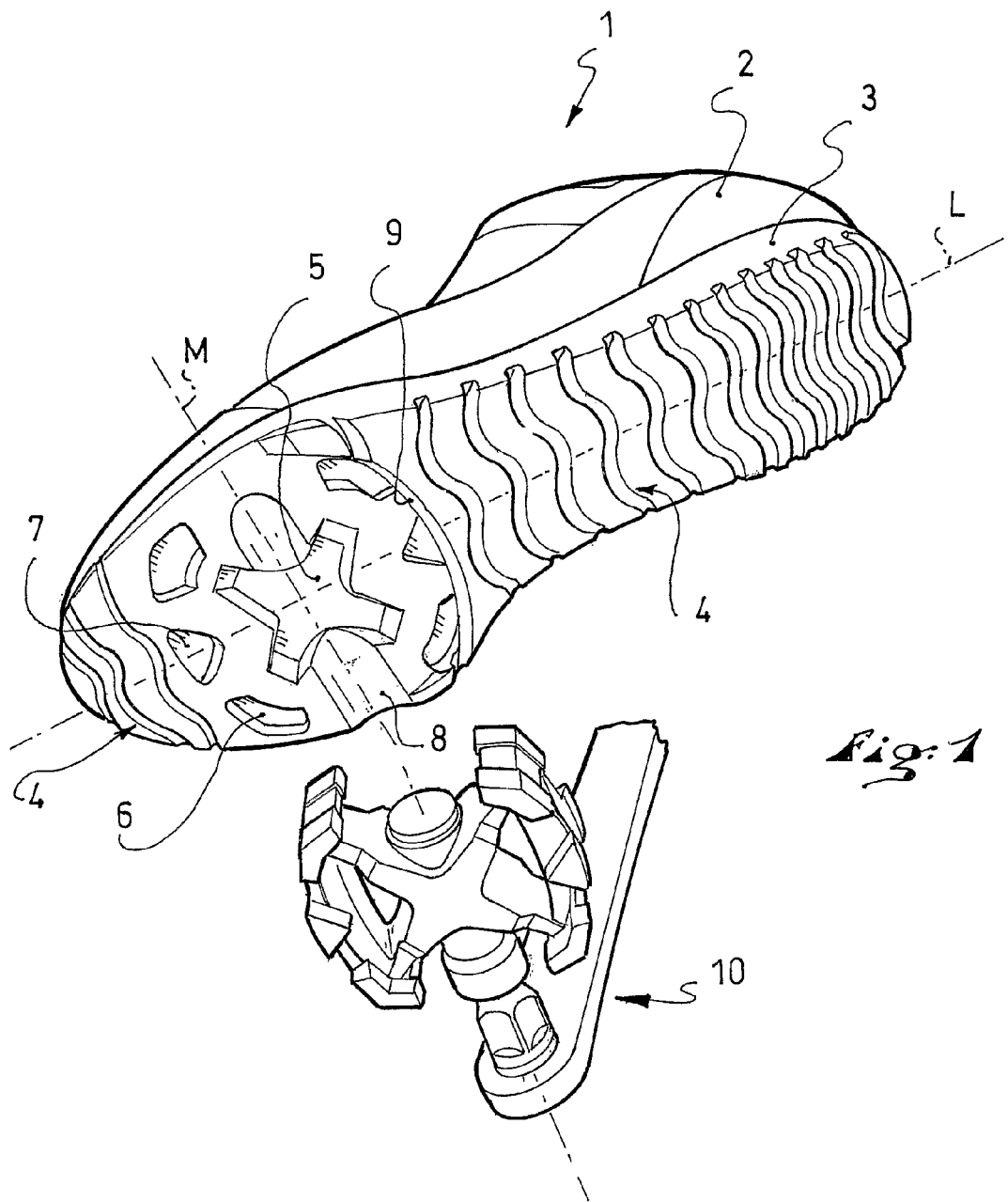
FIG. 1 is an exploded perspective view of the sole of the shoe and of the pedal prior to the mutual connection.
Figure 2:
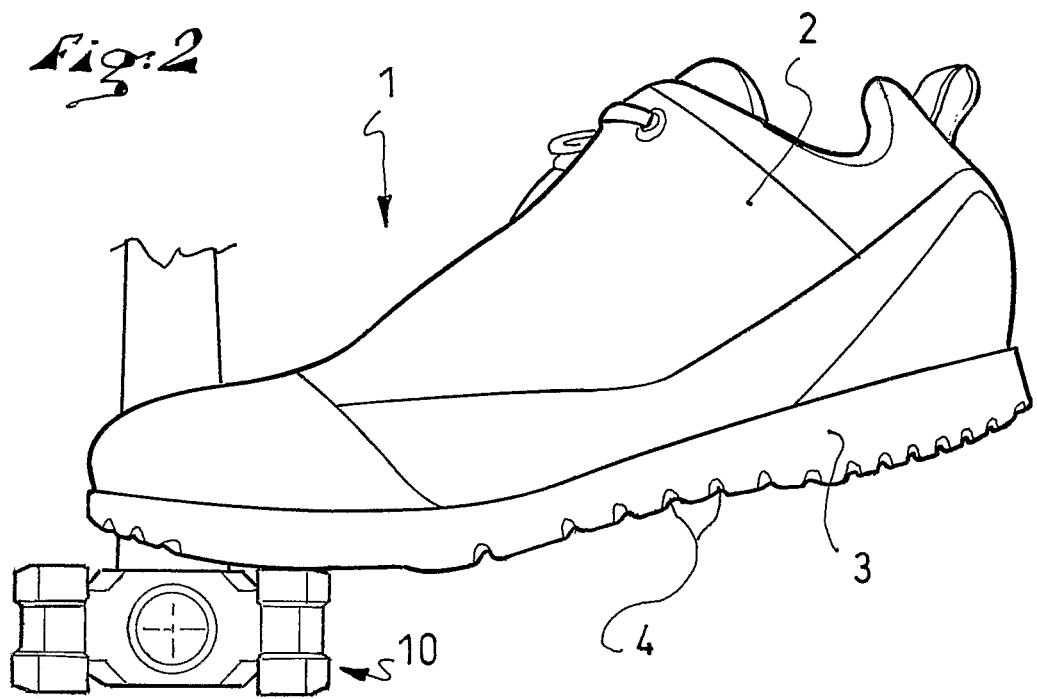
FIG. 2 is a side view of the shoe/pedal assembly during the engagement of the shoe on the pedal.
Figure 3:
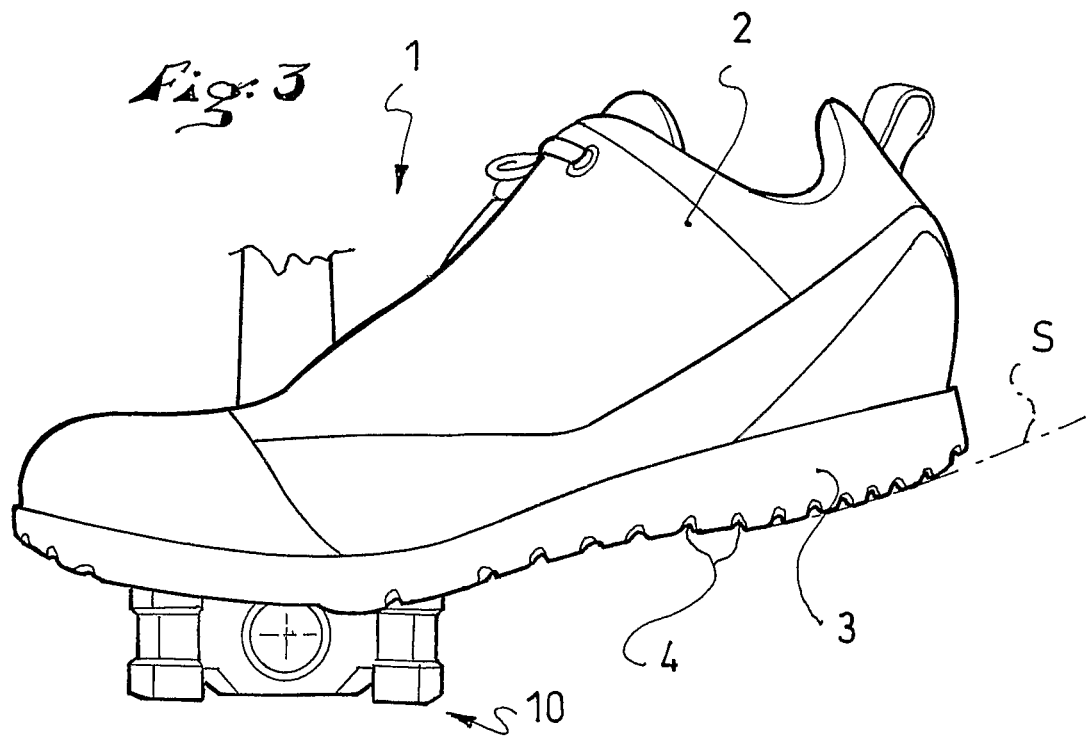
FIG. 3 is a view similar to FIG. 2, the shoe being connected to the pedal.

FIGS. 1 to 3 illustrate the device for connecting a shoe 1 to a bicycle pedal 10 during the various stages of assembly.

As known, the shoe is made of an upper 2, overlaying a so-called walking sole 3, or outsole.

The sole 3 comprises a series of walking sections 4, constituted in this case by reliefs 4 having the shape of waves or wavelets and extending in a generally perpendicular manner with respect to the longitudinal axis L of the shoe.

These wave-shaped reliefs 4, which are adapted to facilitate the grip of the sole 3 on various terrains, can have different shapes depending upon the terrain on which the shoe is more particularly adapted to be used.

As shown in the elevation cross-sectional view of FIG. 9, the free end of each of the waves or reliefs 4, or projections, is contained within an envelope surface S whose profile extends in the longitudinal direction of the shoe. That is, the surfaces of the free ends of the projections 4 extend along the envelope surface S.

Furthermore, in a zone corresponding substantially to the zone of the metatarsophalangeal joint, i.e., in a zone extending on both sides of the axis M of the metatarsophalangeal joint, transverse to the longitudinal axis L, the sole 3 of the shoe comprises a succession of recesses 5, 6, 7, 8, respectively, and a shoulder 9 constituting the attachment members of the sole adapted to cooperate with the bicycle pedal 10, as will be further described below. The bicycle pedal 10 comprises an articulation axle 11 on which a pedal body 12 is mounted, a cross-shaped element 15 with branches 15a, and projections 16, 17, adapted to cooperate with the recesses 5, 6 and 7, respectively, of the sole of the shoe. The branches 15a of the cross are connected in pairs by two bars 18 bearing the projections 16, 17.

As shown particularly well in FIG. 9, the recesses 5, 6, 7, 8 are arranged within or set back with respect to the outer envelope surface S of the sole, and thus do not extend beyond the outsole 3. Further, in the illustrated embodiment, FIG. 8 shows the recesses 5, 6, 7 to be spaced from the outer periphery of the outsole 3, such as spaced from the medial and lateral edges of the outsole. The recess 8, as explained below, extends to the medial side 3b of the sole.

The shoulder 9 is defined by a cutout in the outsole 3, and thus does not extend beyond the outer envelope surface S thereof.

The recess 5 has the shape of a cross or an X, substantially centered on the articulation axis M of the metatarsophalangeal joint, and complementary to the shape of the cross-shaped, or X-shaped, block 15 of the pedal. The recess 5 is also substantially centered in the transverse direction with respect to the sole. In the embodiment illustrated in FIG. 1, then, the outsole 3 has but a single X-shaped recess 5 along which the longitudinal axis L extends. FIG. 1 shows each of the four branches of the X-shape of the recess 5 of the illustrated embodiment to extend at an angle with respect to both the longitudinal axis L and the metatarsophalangeal axis M.

Each branch 5a of the cross-shaped recess 5 ends in an inclined portion 5b. Similarly, each branch 15a of the associated cross-shape element 15 of the pedal also ends in an inclined portion 15b.

The dimensions of the crosses 5, 15 are complementary in order to allow a mutual nesting of these shapes with a slight clearance.

The inclined portions 5b, 15b are adapted to facilitate the mutual engagement of the sole and the pedal, especially in the presence of soil, mud, stones.

The projections 16 and recesses 6 have a substantially chevron polygonal shape. Each arm 16a of the chevron 16 is inclined with respect to the other in the manner of a roof.

The recesses 7 and projections 17 substantially have the shape of a double triangle. Each side 17a of the triangle 17 is inclined with respect to the other in the manner of a roof.

These inclined shapes of the sides 16a, 17a can also facilitate the evacuation of undesirable materials (soil, stones, etc.) during the engagement of the sole on the pedal.

Other shapes can be provided for the recesses and projections 5, 6, 7, 15, 16, 17, respectively, the important thing being for these recesses/projections to have complementary shapes.

As is the case for the crosses 5, 15, the dimensions of the recesses 6, 7 and projections 16, 17 are provided so as to enable nesting with a slight clearance.

The bars 18 bearing the projections 16, 17 substantially have the shape of an arc of a circle in the example shown. The shoulder 9 of the sole substantially has the same shape of an arc of a circle in order to cooperate and to be used as a rear abutment with one or the other of the bars 18 depending upon the position of the pedal. As shown in FIGS. 1 and 8, for example, the shoulder 9 extends across the longitudinal axis L and has a substantial transversely extending length. In contrast with prior art, such as the aforementioned U.S. Pat. No. 4,662,090, the illustrated embodiments of the invention include no forward shoulder, particularly of such a length between which opposite longitudinal sides of the pedal 9 would be engaged.

As shown in particular in FIG. 5, the body of the pedal has a double symmetry with respect to its axis of rotation 11. Consequently, the pedal 10 has two symmetrical sides 10a, each having a double series of projections 16, 17, respectively.

FIG. 5 also shows that the surfaces of each side 10a of the pedal has a slightly curvilinear profile adapted to cooperate with the curvature 3a of the sole in the longitudinal direction (see FIG. 3). The upper surface of the cross 15 is therefore slightly beneath the surfaces of the reliefs 16, 17.

Finally, the recess 8 of the sole 3 has the shape of a half-cylinder and extends from the medial side 3b of the sole on a portion of said sole, substantially parallel to the metatarsophalangeal articulation axis M (see FIG. 8). In the illustrated, non-limiting embodiment, the remaining recesses, i.e., recesses 5, 6, and 7, are spaced from both the lateral as well as the medial sides of the sole.

This recess 8 is adapted to cooperate with the articulation axle 11 of the pedal.

This construction makes it possible to bring the pedal 10 closer to the user's foot as much as possible and is thus advantageous in term of efficiency.

As shown particularly in FIG. 8, the shoulder 9 ends on each side in an abutment 9a adapted to facilitate the centering of the shoe.

Finally, as shown in FIG. 9, the envelope surface S of the outer sole 3 is raised upward at 3c, in relation to the zone comprising the recesses 5, 6, 7 and forward of such zone.

The functioning of the device for connecting the shoe to a pedal, i.e., the pedal of a cycle in particular, is carried out very simply. Indeed, it suffices to engage the raised front end 3c of the sole on the pedal 10, as shown in FIG. 2, with the metatarsophalangeal axis M of the shoe is rearward of the axle of the pedal, and to make it slide forward in relation to the pedal along the envelope surface S until the shoulder 9 comes into abutment against one of the bars 18 of the pedal, at the position shown in FIG. 3, with the metatarsophalangeal axis M positioned substantially at the axle of the pedal. The shoulder 9, then, can be considered a blocking structure of the shoe.

At that moment, the projecting portions 15, 16, 17, respectively, of the pedal become housed in the associated recessed portions 5, 6, 7, respectively, of the sole, this engagement being facilitated by the inclined surfaces 16a, 17a of the projecting portions and 5a, 15a of the cross-shaped portions, respectively (see FIG. 3).

As indicated above, the abutments 9a on respective sides of the shoulder 9 have respective shoe-guiding surfaces extending in a direction that is both rearward and toward the longitudinal axis L for engagement with respective ones of the projecting portions 16 (evident from FIG. 8, for example) to enable the pedal to be centered, transversely, on the sole 3. The guiding surface of each of the abutments 9a is a side surface, that is, the surface is on the side of the abutment. The abutments 9a, then, can be considered guiding structure of the shoe. Thus, by virtue of the shoulder 9 blocking the shoe in a definitive longitudinal position relative to the pedal, and by virtue of the abutments 9a guiding the shoe to a definitive transverse position relative to the pedal, the projecting portions 15, 16, 17 of the pedal are brought into registration with the recessed portions 5, 6, 7 of the shoe.

Thus, in spite of the blind shoe insertion, the sole/pedal connection, i.e. registration, occurs automatically and without difficulty, in particular due to the more pronounced curvature 3c of the envelope surface S at the front of the recessed zone.

A correct positioning of the user's foot with respect to the pedal is therefore guaranteed and allows better ergonomics and less muscular fatigue.

Furthermore, the relative clearances between the recesses and the projections allow for a certain adaptation to the user's morphology.

Finally, the X-shape of the central connecting members 5, 15 prevents a relative rotation of the shoe with respect to the pedal.

Moreover, due to its shape, the pedal 10 is compatible with normal shoes since it provides supports by means of the relief surfaces 16, 17 that are higher with respect to the surfaces of the cross 15. According to one embodiment, the crosses 15 are covered with a smooth coating 25, such as POM DELRIN® or PE (polyethylene) or PTFE (i.e., polytetrafluoroethylene or TEFLON®), of the pedal on the sole, whereas the peripheral relief portions 16, 17 are made of a rougher material adapted to facilitate the grip on the sole 3.

FIGS. 10 and 11 show an exemplary embodiment, in which similar or identical elements are designated by the same reference numerals used in the foregoing description.

The only difference with respect to the embodiments shown hereinabove is that the sole 3 is made of a plurality of materials as a function of the various zones 31, 32, 33, 34 thereof.

Indeed, in the zones 32, 33 comprising the recesses 5, 6, 7, 8, 9, namely the zone of the attachment members of the sole, the material is made of a harder material than in the zones 31, 34 of the sole that is located on both sides of these zones.

In the example shown, the material in the zones 31, 34 is made out of a rubber having a hardness of 65 Shore A, namely a rubber which is not very hard, with great adherence properties.

As the case may be, this material can be replaced by a slightly harder rubber or another material having good adherence properties, such as TPU.

If the issue related to adherence is not important, the material of the zones 31, 34 can also be different and be made, for example, of a harder rubber.

The material of the zone around the projections 6, 7 is, in this example, a plate of TPU with a hardness ranging from 70 Shore A to 80 Shore A, i.e., a plate made out of a sufficiently hard material having a lower coefficient of friction than the rubber of the remainder of the sole, i.e., the portion of the sole rearward of the zone around the projections 6, 7, in order to facilitate the sliding of the sole on the pedal in the front portion of the attachment members. In the example, this plate of TPU is approximately 2 mm thick and is housed in an associated recess of the sole.

The material of the zone 33, which is the rear portion of the zone of the attachment members of the sole, for example, is a rubber having a hardness ranging from approximately 80 to 85 Shore A.

The material of the zone 33 is therefore slightly harder than that of the zones 31, 34 of the sole, while having similar adherence characteristics. The material of the zone 33 can be overmolded with the remainder of the sole, since it is made of the same type of material as that 31, 34 of the other zones thereof. As the case may be, this could be an attached plate.

This greater hardness of the material in the zone 33 makes it possible to limit the wear and the deformations of the portions that cooperate with the sole.

Conversely, preserving a rubber-type material in this zone is advantageous in maintaining a good grip of the sole on the bicycle pedal.

Other materials can be employed depending upon the intended use. For example, for indoor use (rowing machine, exercise bike), the use of a rubber material in the zones 31, 34 is not necessarily desired.

The invention is not limited to the embodiments described hereinabove by way of non limiting examples, but includes all similar or equivalent embodiments thereof.

Although described in connection with a bicycle pedal, the invention can be applied to other sports equipments in which similar or identical problems arise, for example, exercise bike, exercise apparatus (rowing machine, etc), rowing equipment.

The invention claimed is:

1. A connecting device for connecting a shoe to an element of a sports article, said connecting device comprising:
attachment members of the sports article element;
attachment members of an outsole of the shoe;
the attachment members of the sports article element having shapes complementary to shapes of the attachment members of the outsole of the shoe;
the shape of the attachment members of the outsole of the shoe comprising alternating recesses structured and arranged to be set back with respect to an outer envelope surface of the outsole of the shoe;
the outsole of the shoe further comprising:
a blocking structure configured and arranged to block forward sliding movement of the shoe in relation to the sports article element at a definitive longitudinal position in relation to the sports article element;
a guiding structure configured and arranged to guide the shoe to a definitive transverse position in relation to the sports article during said forward movement;
the guiding structure including a pair of abutments transversely spaced apart and on opposite respective sides of a longitudinal axis of the outsole;
the pair of abutments having respective shoe-guiding surfaces extending in a direction that is both rearward and toward the longitudinal axis of the outsole to guide the shoe to the definitive transverse position during said forward sliding movement of the shoe.

2. A connecting device according to claim 1, wherein:
said connecting device comprises a cycle pedal.

3. A connecting device according to claim 1, wherein:
the outer envelope surface of the outsole is raised upward forward of a zone of the attachment members of the outsole.

4. A connecting device according to claim 1, wherein:
a zone of the attachment members of the outsole is located substantially in an area of a metatarsophalangeal joint of the foot.

5. A connecting device according to claim 1, wherein:
the blocking structure of the outsole of the shoe comprises, in a zone of the attachment members of the outsole, a rear abutment for engagement with the sports article element.

6. A connecting device according to claim 1, further comprising:
the attachment members of the sports article element comprises:
a central attachment member having a X-shape adapted to be complementary with a central attachment member of the outsole of the shoe;
peripheral attachment members extending either medially or laterally beyond the X-shape central attachment member.

7. A connecting device according to claim 6, wherein:
at least a portion of the X-shaped central attachment member of the sports article element is provided with a surface smoother than surfaces of the peripheral attachment members.

8. A connecting device according to claim 7, wherein:
the surface of the portion of the X-shaped central attachment member of the sports article element is a surface of polyethylene or a surface of polytetrafluoroethylene.

9. A connecting device according to claim 1, wherein:
at least a plurality of the attachment members of the sports article element have inclined surfaces adapted to be complementary to inclined surfaces of the outsole of the shoe.

10. A connecting device according to claim 1, wherein:
the connecting device comprises a pedal having a rotational axle adapted to fit within a recess of the outsole to at least partially house the axle of the pedal.

11. A connecting device according to claim 1, wherein:
the outsole comprises material having a lower coefficient of friction in a front portion of a zone of the attachment members of the outsole than a portion of the outsole rearward of the front portion of the zone of the attachment members of the outsole.

12. A connecting device according to claim 1, wherein:
the blocking structure comprises a shoulder intersecting a longitudinal axis of the shoe;
the shoulder is structured and arranged for engagement with at least one of the attachment members of the sports article element;
the shoulder is set back within the outer envelope surface of the outsole of the shoe.

13. A connecting device according to claim 12, wherein:
the guiding structure comprises a pair of abutments on different respective sides of the longitudinal axis of the shoe;
the pair of abutments are structured and arranged for engagement with respective ones of the attachment members of the sports article element.

14. A connecting device according to claim 12, wherein:
the shoulder of the blocking structure of the outsole has a predetermined transversely extending length and is the only shoulder of the outsole extending said length.

15. A connecting device according to claim 1, wherein:
no more than one of the recesses of the outsole of the shoe is spaced from both a medial side and a lateral side of the outsole.

16. A connecting device according to claim 1, wherein:
the shoe-guiding surfaces of the pair of abutments are side surfaces of the pair of abutments.

17. A connecting device for connecting a shoe to a pedal of a sports article, said connecting device comprising:
attachment members of the pedal;
attachment members of an outsole of the shoe;
the attachment members of the pedal having shapes complementary to shapes of the attachment members of the outsole of the shoe;
the shape of the attachment members of the outsole of the shoe comprising alternating recesses structured and arranged to be set back with respect to an outer envelope surface of the outsole of the shoe;
the outsole of the shoe further comprising:
a blocking structure configured and arranged to block forward sliding movement of the shoe in relation to the pedal at a definitive longitudinal position in relation to the pedal;
a guiding structure configured and arranged to guide the shoe to a definitive transverse position in relation to the sports article during said forward movement;
the pedal having a central attachment member;
the pedal comprising peripheral attachment members extending either medially or laterally beyond the central attachment member and having a height greater than a height of the central attachment member.

18. A shoe/pedal assembly comprising a system for connecting the shoe to the pedal, said assembly comprising:

a shoe comprising an upper and an outsole, said outsole having sole attaching members;

a pedal having pedal attachment members;

the sole attaching members being structured and arranged to be complementary in shapes with shapes of the pedal attachment members;

the shapes of the attachment members of the outsole comprising alternating recesses structured and arranged to be set back with respect to an outer envelope surface of the outsole;

the outsole of the shoe further comprising:

a blocking structure configured and arranged to block forward sliding movement of the shoe in relation to the pedal at a definitive longitudinal position in relation to the pedal;

a guiding structure configured and arranged to guide the shoe to a definitive transverse position in relation to the pedal during said forward sliding movement;

the guiding structure including a pair of abutments transversely spaced apart and on opposite respective sides of a longitudinal axis of the outsole;

each of the pair of abutments having respective shoe-guiding surfaces extending in a direction that is both rearward and toward the longitudinal axis of the outsole to guide the shoe to the definitive transverse position during said forward sliding movement of the shoe.

19. A connecting device according to claim 18, wherein:
the shoe-guiding surfaces of the pair of abutments are side surfaces of the pair of abutments.

20. A sports apparatus comprising:
shoe/pedal assembly comprising a system for connecting the shoe to the pedal, said assembly comprising:

a shoe comprising an upper and an outsole, said outsole having sole attaching members;

a pedal having pedal attachment members;

the sole attaching members being structured and arranged to be complementary in shapes with shapes of the pedal attachment members;

the shapes of the attachment members of the outsole comprising alternating recesses structured and arranged to be set back with respect to an outer envelope surface of the outsole;

the outsole of the shoe further comprising:

a blocking structure configured and arranged to block forward sliding movement of the shoe in relation to the pedal at a definitive longitudinal position in relation to the pedal;

a guiding structure configured and arranged to guide the shoe to a definitive transverse position in relation to the pedal during said forward sliding movement;

the guiding structure including a pair of abutments transversely spaced apart and on opposite respective sides of a longitudinal axis of the outsole;

the pair of abutments having respective shoe-guiding surfaces extending in a direction that is both rearward and toward the longitudinal axis of the outsole to guide the shoe to the definitive transverse position during said forward sliding movement of the shoe.

21. A connecting device according to claim 20, wherein:
the shoe-guiding surfaces of the pair of abutments are side surfaces of the pair of abutments.

22. A connecting device for connecting a shoe to an element of a sports article, said connecting device comprising:

attachment members of the sports article element;

attachment members of an outsole of the shoe;

the attachment members of the sports article element having shapes complementary to shapes of the attachment members of the outsole of the shoe;

the shape of the attachment members of the outsole of the shoe comprising alternating recesses structured and arranged to be set back with respect to an outer envelope surface of the outsole of the shoe;

one of the attachment members of the outsole comprising a four-branch cross-shape or X-shape;

a metatarsophalangeal joint axis of the outsole of the shoe extending through the cross-shape or X-shape.

23. A connecting device according to claim 22, wherein:
a longitudinal axis of the outsole of the shoe extends through the cross-shape or the X-shape.

24. A connecting device according to claim 22, wherein:
each of the cross-shape or X-shape attachment member has a predetermined size and is the only cross-shape or X-shape attachment member of said predetermined size.

25. A connecting device according to claim 24, wherein:
the cross-shape or X-shape is spaced from both a medial and a lateral side of the shoe.

26. A connecting device according to claim 22, wherein:
the outsole of the shoe comprises:

a blocking structure configured and arranged to block forward sliding movement of the shoe in relation to the sports article element at a definitive longitudinal position in relation to the sports article element;

a guiding structure configured and arranged to guide the shoe to a definitive transverse position in relation to the sports article during said forward sliding movement.

27. A connecting device according to claim 22, wherein:
each branch of the four-branch cross-shape or X-shape of said one of the attachment members of the outsole extends at an angle greater than zero in relation to an immediately adjacent branch.

* * * * *